(12) United States Patent
Ridgway et al.

(10) Patent No.: US 8,979,128 B2
(45) Date of Patent: Mar. 17, 2015

(54) COLLAPSIBLE STEERING COLUMN ASSEMBLY

(75) Inventors: Jason R. Ridgway, Bay City, MI (US); Malgorzata Renata Szeliga, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 12/790,775

(22) Filed: May 28, 2010

(65) Prior Publication Data

US 2010/0300237 A1 Dec. 2, 2010

Related U.S. Application Data

(60) Provisional application No. 61/217,327, filed on May 29, 2009.

(51) Int. Cl.
  *B62D 1/184* (2006.01)
  *B62D 1/19* (2006.01)

(52) U.S. Cl.
  CPC ............... *B62D 1/184* (2013.01); *B62D 1/195* (2013.01)
  USPC .............................. 280/777; 280/775; 74/493

(58) Field of Classification Search
  CPC ................................ B62D 1/184; B62D 1/195
  USPC ..................... 74/492, 493, 495; 280/775, 777
  See application file for complete search history.

(56) References Cited

U.S. PATENT DOCUMENTS

| | | | | |
|---|---|---|---|---|
| 3,600,971 A | * | 8/1971 | Scarvelis et al. | 74/492 |
| 4,102,217 A | * | 7/1978 | Yamamoto et al. | 74/492 |
| 4,884,778 A | * | 12/1989 | Yamamoto | 248/548 |
| 4,890,505 A | * | 1/1990 | Kinoshita et al. | 74/493 |
| 5,082,311 A | * | 1/1992 | Melotik | 280/777 |
| 5,390,955 A | * | 2/1995 | Kaliszewski et al. | 280/777 |
| 6,419,269 B1 | * | 7/2002 | Manwaring et al. | 280/775 |
| 6,467,807 B2 | * | 10/2002 | Ikeda et al. | 280/775 |
| 6,474,690 B1 | * | 11/2002 | Marxer et al. | 280/777 |
| 6,530,600 B1 | * | 3/2003 | Marxer et al. | 280/777 |
| 6,616,185 B2 | * | 9/2003 | Manwaring et al. | 280/775 |
| 6,659,504 B2 | * | 12/2003 | Riefe et al. | 280/777 |
| 7,874,228 B2 | * | 1/2011 | Clark et al. | 74/493 |
| 7,942,076 B2 | * | 5/2011 | Olgren | 74/493 |
| 2003/0057694 A1 | * | 3/2003 | Manwaring et al. | 280/775 |
| 2003/0172765 A1 | * | 9/2003 | Heiml | 74/493 |
| 2003/0193180 A1 | * | 10/2003 | Riefe et al. | 280/777 |
| 2004/0104566 A1 | * | 6/2004 | Adoline et al. | 280/775 |
| 2004/0155448 A1 | * | 8/2004 | Klukowski et al. | 280/777 |
| 2004/0159173 A1 | * | 8/2004 | Sawada | 74/492 |
| 2006/0207379 A1 | * | 9/2006 | Riefe et al. | 74/492 |

(Continued)

*Primary Examiner* — Justin Krause
*Assistant Examiner* — Gregory Prather
(74) *Attorney, Agent, or Firm* — Cantor Colburn LLP

(57) ABSTRACT

A collapsible steering column assembly includes a bracket, the bracket having a front portion and a back portion, the front portion comprising a pair of spaced arms, each arm having an inner surface that opposes the inner surface of the other and an opposed outer surface; a steering column having a longitudinal axis and comprising an inner jacket that is slidably disposed within an inner surface of the outer jacket, an outer surface of the outer jacket located within the inner surface of the spaced arms; and a locking device that passes through and is coupled to the spaced arms and the outer jacket, the locking device movable to lock or unlock the slidable disposition of the inner jacket within the outer jacket by respective application or release of a predetermined clamping force to the outer surface of the arm, outer bracket and inner bracket.

18 Claims, 15 Drawing Sheets

(56) References Cited

U.S. PATENT DOCUMENTS

| | | | |
|---|---|---|---|
| 2007/0252372 A1* | 11/2007 | Spano et al. | 280/775 |
| 2007/0295144 A1* | 12/2007 | Nishioka et al. | 74/493 |
| 2007/0295145 A1* | 12/2007 | Sekii et al. | 74/493 |
| 2008/0116675 A1* | 5/2008 | Eggers et al. | 280/775 |
| 2008/0178702 A1* | 7/2008 | Lutz | 74/493 |
| 2008/0196536 A1* | 8/2008 | Manwaring et al. | 74/493 |
| 2009/0090210 A1* | 4/2009 | Menjak et al. | 74/492 |
| 2010/0300237 A1* | 12/2010 | Ridgway et al. | 74/493 |

* cited by examiner

COLLAPSIBLE STEERING COLUMN ASSEMBLY

CROSS-REFERENCES TO RELATED APPLICATIONS

This patent application claims priority to U.S. Provisional Patent Application Ser. No. 61/217,327 filed May 29, 2009, which is incorporated herein by reference in its entirety.

FIELD OF THE INVENTION

The subject invention relates to a collapsible steering column assembly for a vehicle having a clamping mechanism that applies clamping pressure to axially constrain the collapsible members during normal operation of the vehicle. More particularly, it relates to a steering column assembly that enables the clamping pressure to be relieved without having to overcome the axial constraints of the clamp mechanism.

BACKGROUND

Steering columns are disposed in vehicles to support the steering wheel for use by the driver. Adjustable steering columns are disposed to enable the driver to change the position of the steering wheel to enhance safe, comfortable and convenient turning of the wheel and steering of the vehicle. Raking movement and tilting movement change the angular position of the steering wheel. Telescoping movement changes the axial position of the steering wheel along the center axis of the steering column relative to the dashboard, the steering wheel moving outward or inward from the dashboard. Adjustable steering columns include locks to prevent movement of the steering wheel after the desired position of the steering wheel has been established. Such columns are also collapsible to facilitate axial movement, absorption and dissipation of energy in an extreme impact event. This collapse may be accomplished by the use of a nested upper or inner column jacket proximate the steering wheel and lower or outer column jacket away from the wheel that move relative to one another to facilitate the collapse of the steering column. Such steering column designs generally use a clamping mechanism that axially constrains the upper and lower steering column jackets during normal operation of the vehicle.

There is a need to provide an effective means of "releasing" clamp mechanisms that axially constrain the inner steering column jacket to the outer steering column jacket during collapse of adjustable steering columns. Current designs of the same basic column architecture allow the inner jacket to translate inside the outer jacket during column collapse only by defeating the axial constraints of the clamping mechanism. Accordingly, it is desirable to provide design alternatives that do not require this constraint.

SUMMARY OF THE INVENTION

In one exemplary embodiment of the present invention, a collapsible steering column assembly is disclosed. The assembly includes a column mounting bracket configured for mounting to a vehicle, the bracket having a front portion and a back portion, the front portion comprising a pair of spaced arms, each arm having an inner surface that opposes the inner surface of the other and an opposed outer surface. The assembly also includes a steering column having a longitudinal axis and comprising an inner jacket that is slidably disposed within an inner surface of the outer jacket, an outer surface of the outer jacket located within the inner surface of the spaced arms. The assembly also includes a locking device that passes through and is coupled to the spaced arms and the outer jacket, the locking device movable to lock or unlock the slidable disposition of the inner jacket within the outer jacket by respective application or release of a predetermined clamping force to the outer surface of the arm, outer bracket and inner bracket; the locking device, inner surface of the arms and the outer surface of the outer jacket axially movable a predetermined distance while locked upon application of a predetermined release force to the exposed end to provide axial separation of the outer surface of the outer bracket from the inner surface of the arms and release the application of the predetermined clamping force between the outer jacket and inner jacket, thereby allowing the inner jacket to collapse into the outer jacket a upon application of the predetermined release force.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

In accordance with an exemplary embodiment of the present invention, a collapsible steering column is provided which provides an effective means of relieving the clamp pressure of the clamp mechanism allow the upper steering column jacket to collapse inside of the lower jacket without having to overcome the axial constraints of the clamp mechanism.

Referring to the FIGS, wherein like numerals indicate like or corresponding parts throughout the several views, a collapsible steering column assembly 20 for a vehicle, such as various known vehicle configuration (not shown), is generally shown in FIGS. 1, 4, 6 and 8.

Figure 1:
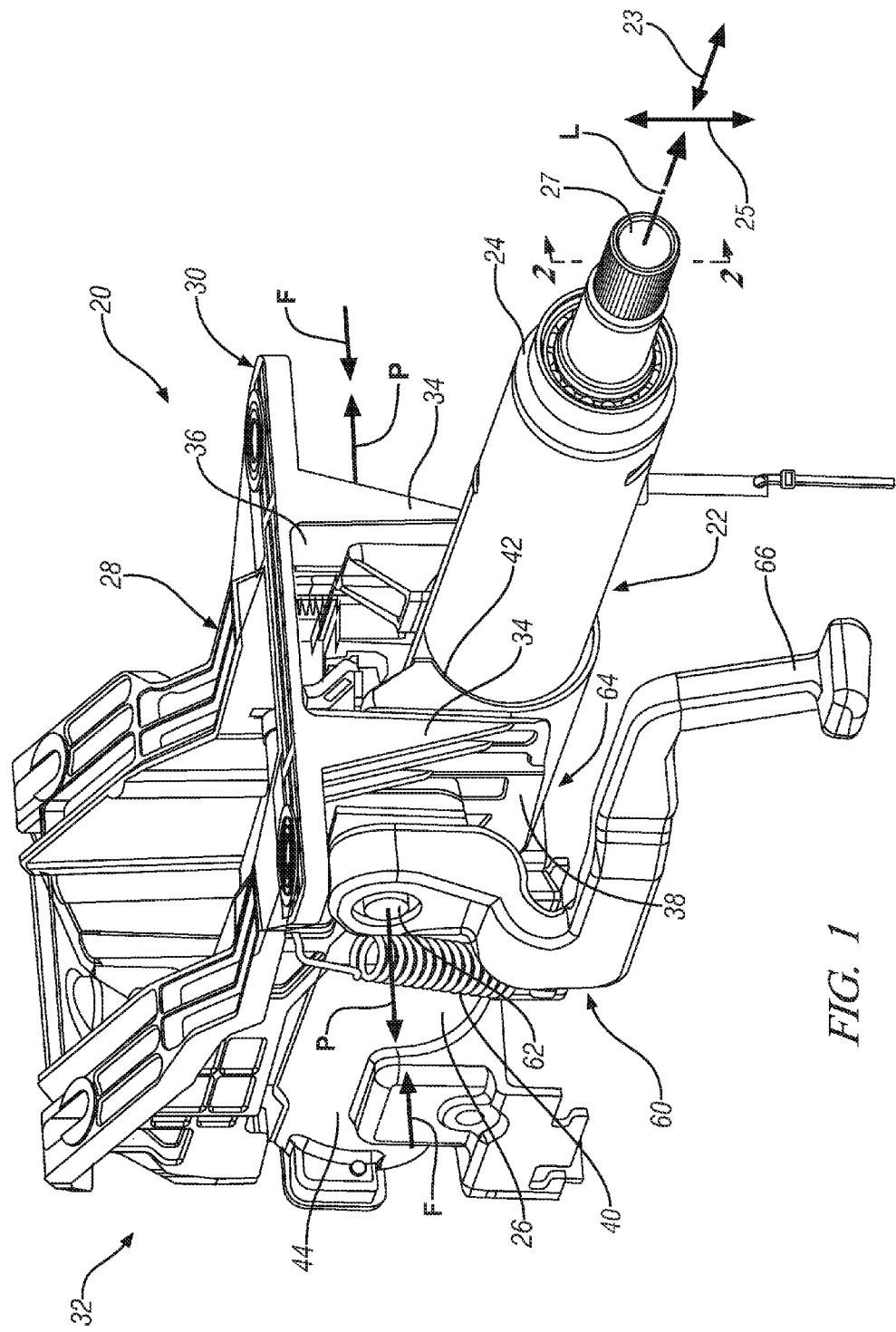
FIG. 1 is a perspective left side view of an exemplary embodiment of a collapsible steering column assembly in a pre-collapse position.
Figure 2:
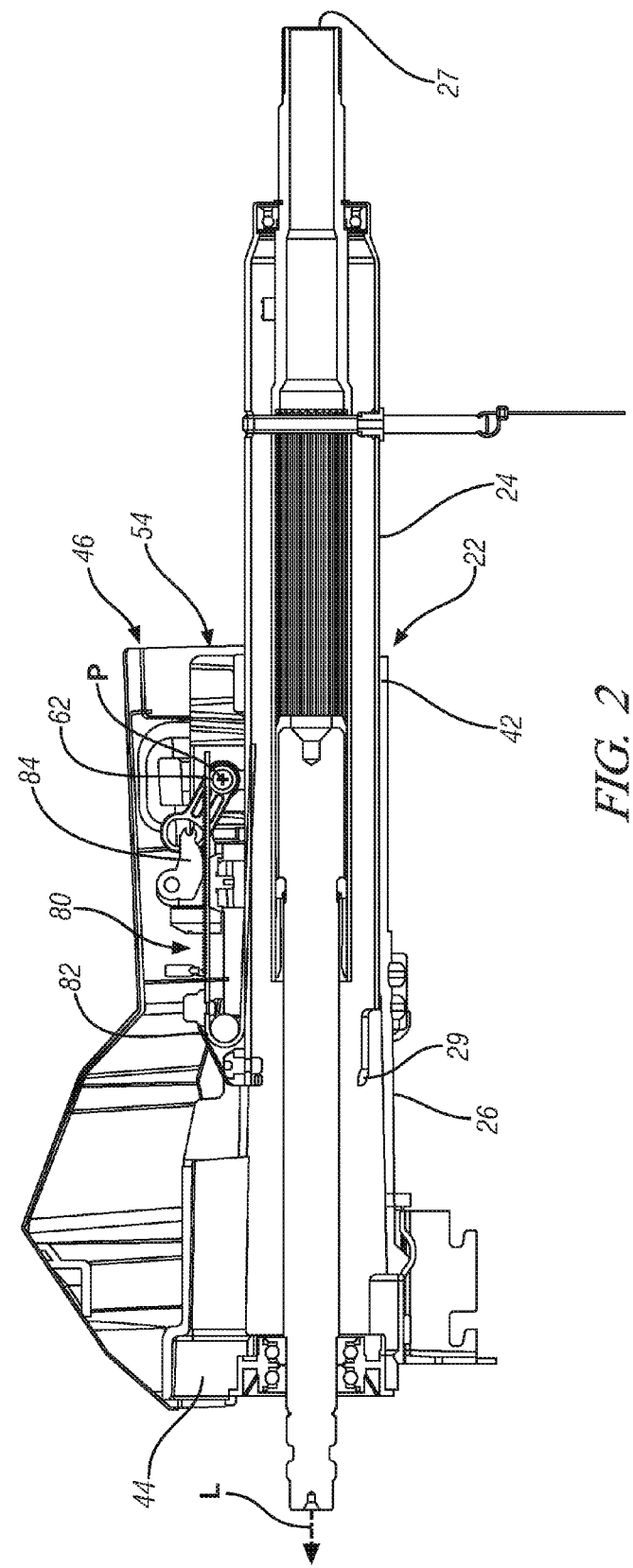
FIG. 2 is a cross-sectional view of the collapsible steering column assembly in a pre-collapse position of FIG. 1, taken along Section 2-2.
Figure 3:
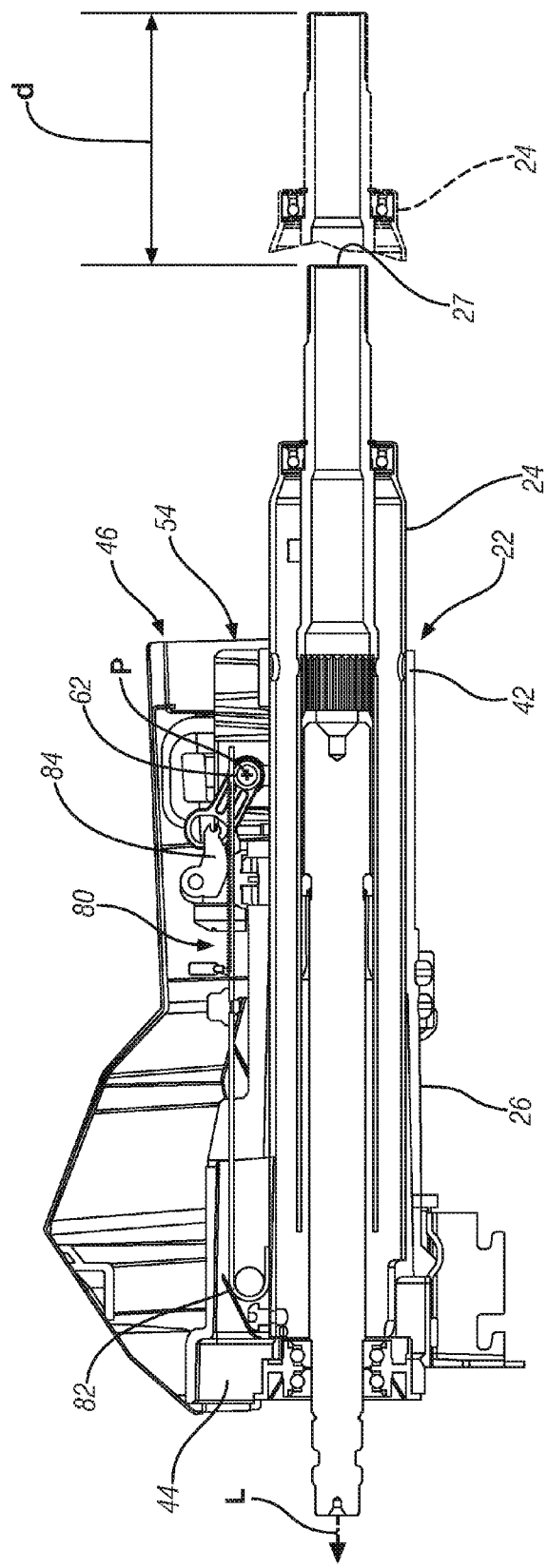
FIG. 3 is a cross-sectional view of the collapsible steering column assembly of FIG. 2 in a post-collapse position.

Referring to FIGS. 1-3, the collapsible steering column assembly 20 includes a steering column 22 defining a longitudinal axis L. The steering column 22 includes an inner jacket 24 and an outer jacket 26 with the inner jacket 24 slidably disposed and/or collapsible within the outer jacket 26 along the longitudinal axis L when a predetermined axial compressive collapse force is applied to the inner jacket 24, such as when the vehicle is in a collision and the sudden deceleration causes the driver to press against the jacket through the airbag (not shown) and steering wheel (not shown). As shown in FIG. 2, the steering column 22 is shown in a pre-collapse position in which the predetermined force has not been applied. As shown in FIG. 3, the steering column 22 is shown in a post-collapse position in which the predetermined force has been achieved. The predetermined force may be any suitable force, including a force of about 2000 N. It is to be appreciated that the predetermined force may be higher or lower than 2000 N depending on the design requirements of the vehicle manufacturer. Further, the inner jacket 24 may stroke or travel a predetermined distance d (FIG. 3) within the outer jacket 22 of about 100 millimeters between the pre-collapse position and the post-collapse position. It is to be appreciated that the inner jacket 24 may travel more or less than 100 millimeters between the pre-collapse position and the post-collapse position depending on the vehicle requirements of the manufacturer.

As illustrated, for example, in FIG. 1, the steering column 22 is also adjustable in a telescoping direction 23 and a raking (tilting) direction 25. A steering wheel (not shown) is coupled to the inner jacket 24 for allowing a driver to adjust the steering column 22 in the telescoping and raking directions 23, 25 within a vehicle compartment (not shown). More specifically, a nested end 29 (FIG. 2) of the inner jacket 24 is slidably disposed in the outer jacket 26 along the longitudinal axis L for allowing adjustments in the telescoping direction 23 while the inner and outer jackets 24, 26 move together in an arcuate vertical path transverse to the longitudinal axis L for movement in the raking direction 25. In other words, the steering wheel moves closer to and away from the driver when adjusting the telescoping direction 23 and the steering wheel moves up and down relative to the driver when adjusting the raking direction 25. Typically, the steering wheel is adjustable in both the telescoping and raking directions 23, 25. It is to be appreciated that the steering wheel may be adjustable only in the telescoping direction 23 or only in the raking direction 25.

Figure 4:
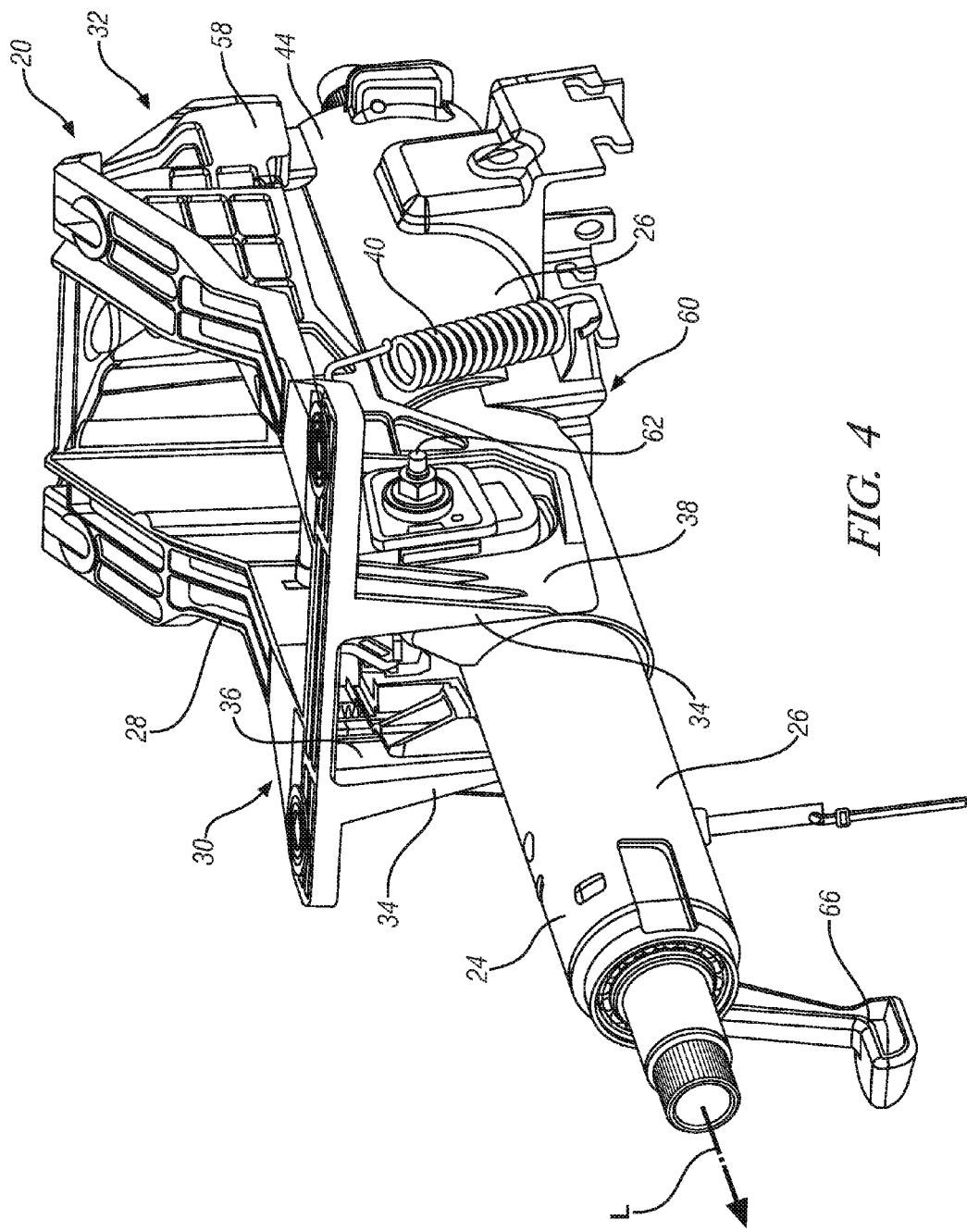
FIG. 4 is a partial perspective right side view of the collapsible steering column assembly of FIG. 1.
Figure 5:
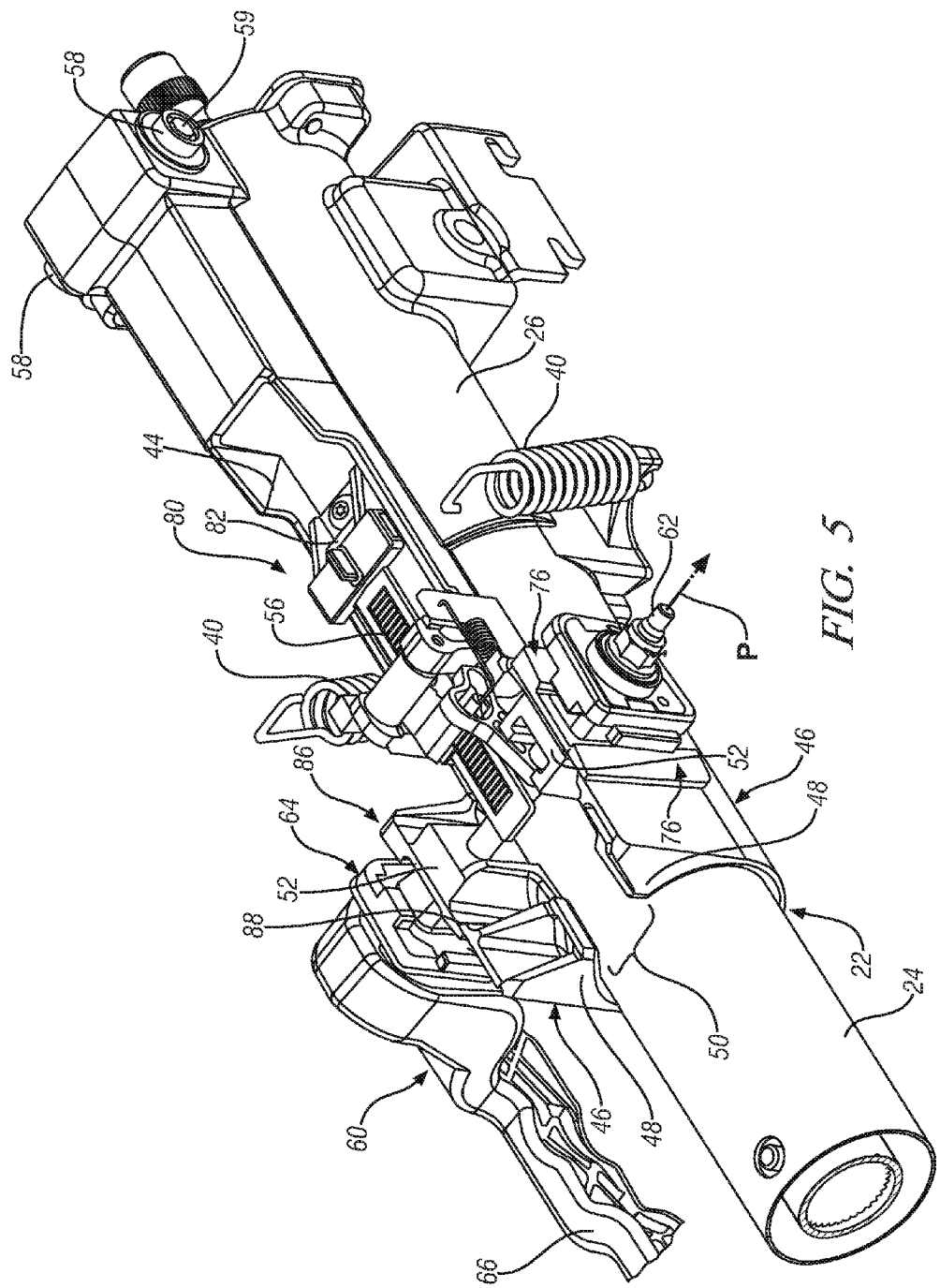
FIG. 5 is a partial enlarged perspective right side view of the outer and inner column jackets (and associated components) of the collapsible steering column assembly of FIG. 4.

Referring to FIGS. 1, 4 and 5, the collapsible steering column assembly 20 further includes a column mounting bracket 28 affixed to the vehicle and coupled to the inner and outer jackets 24, 26 for supporting the inner and outer jackets 24, 26. The bracket 28 includes a front portion 30 and a back portion 32 spaced from each other relative to the longitudinal axis L. The front portion 30 of the bracket 28 includes a pair of opposed arms 34 extending downwardly and spaced apart from one another transverse to the longitudinal axis L. The arms 34 flank the outer jacket 26 and more specifically, the inner and outer jackets 24, 26 are disposed between the arms 34 and are releasably coupled to the arms 34. It is to be appreciated that the front and back portions 30, 32 of bracket 28 may be integrally formed or affixed to one another by any suitable permanent joint, such as various welds, or by the use of various joining devices, such as various types of fasteners, etc. It is to be further appreciated that the arms 34 may be integrally formed with the front portion 30 or formed separately and affixed to the front portion by any suitable permanent joint, such as various welds, or by the use of various joining devices, such as various types of fasteners, etc.

Figure 6:
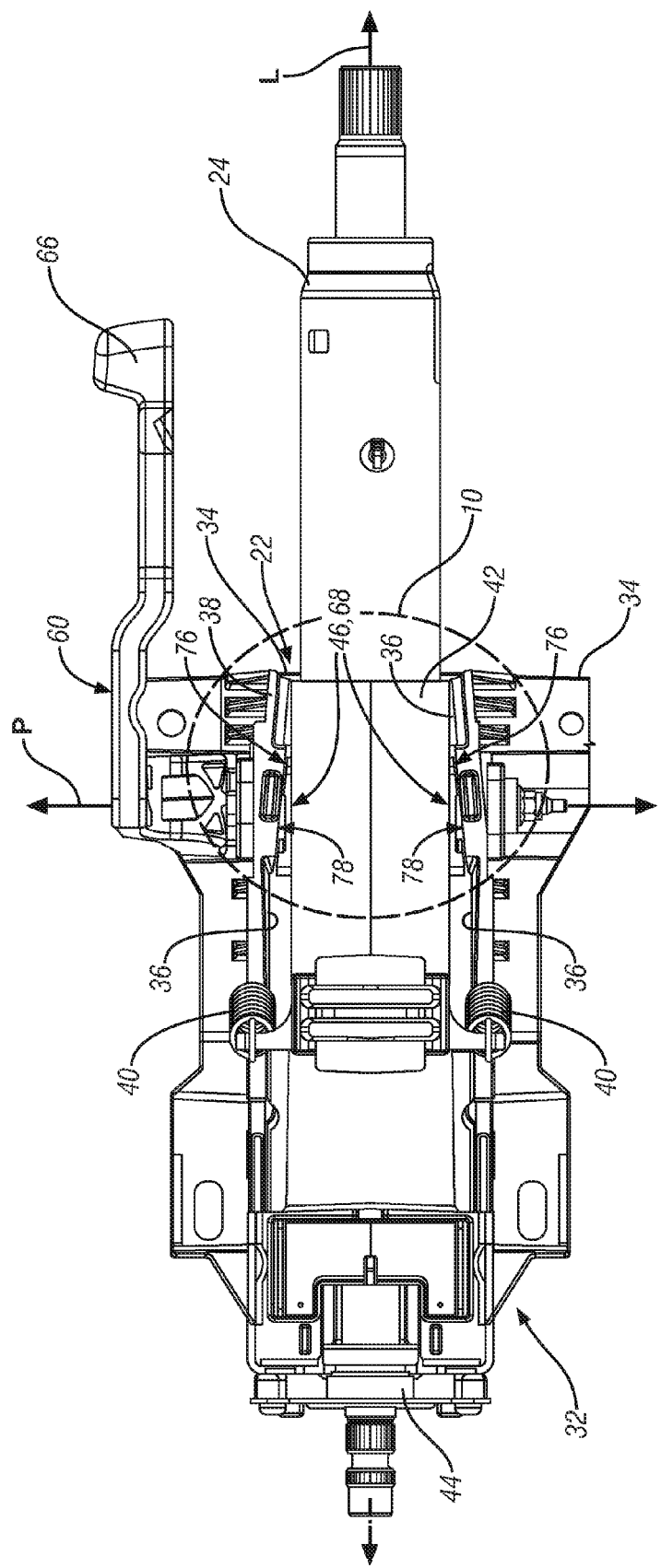
FIG. 6 is a bottom view of the collapsible steering column assembly of FIG. 1 with the outer jacket axially spaced from a pair of arms of the column mounting bracket in the post-collapse position.

Also referring to FIGS. 1 and 6, each of the arms 34 include an inner surface 36 and an outer surface 38 spaced radially away from each other relative to the longitudinal axis L with the inner surface 36 of each of the arms 34 facing the outer jacket 26. The collapsible steering column assembly 20 further includes a biasing member 40 attached to the outer jacket 26 and one of the arms 34 and another biasing member 40 is attached to the outer jacket 26 and the other one of the arms 34 for biasing the steering column 22 and preventing the column and steering wheel from inadvertently dropping onto the driver's legs during adjustment of the column position. The biasing member 40 may include a coil spring.

Referring to FIGS. 1, 2 and 6, the outer jacket 26 includes an inner end 42 and an outer end 44 spaced from each other relative to the longitudinal axis L with the inner jacket 24 slidably disposed within the inner end 42 of the outer jacket 26. The inner end 42 of the outer jacket 26 engages the arms 34 of the front portion 30 of the bracket 28 when in the pre-collapse position. More specifically, the inner end 42 of the outer jacket 26 includes a pair of side portions 46 radially spaced from each other relative to the longitudinal axis L with each of the side portions 46 abutting respective arms 34 when in the pre-collapse position.

Figure 7:
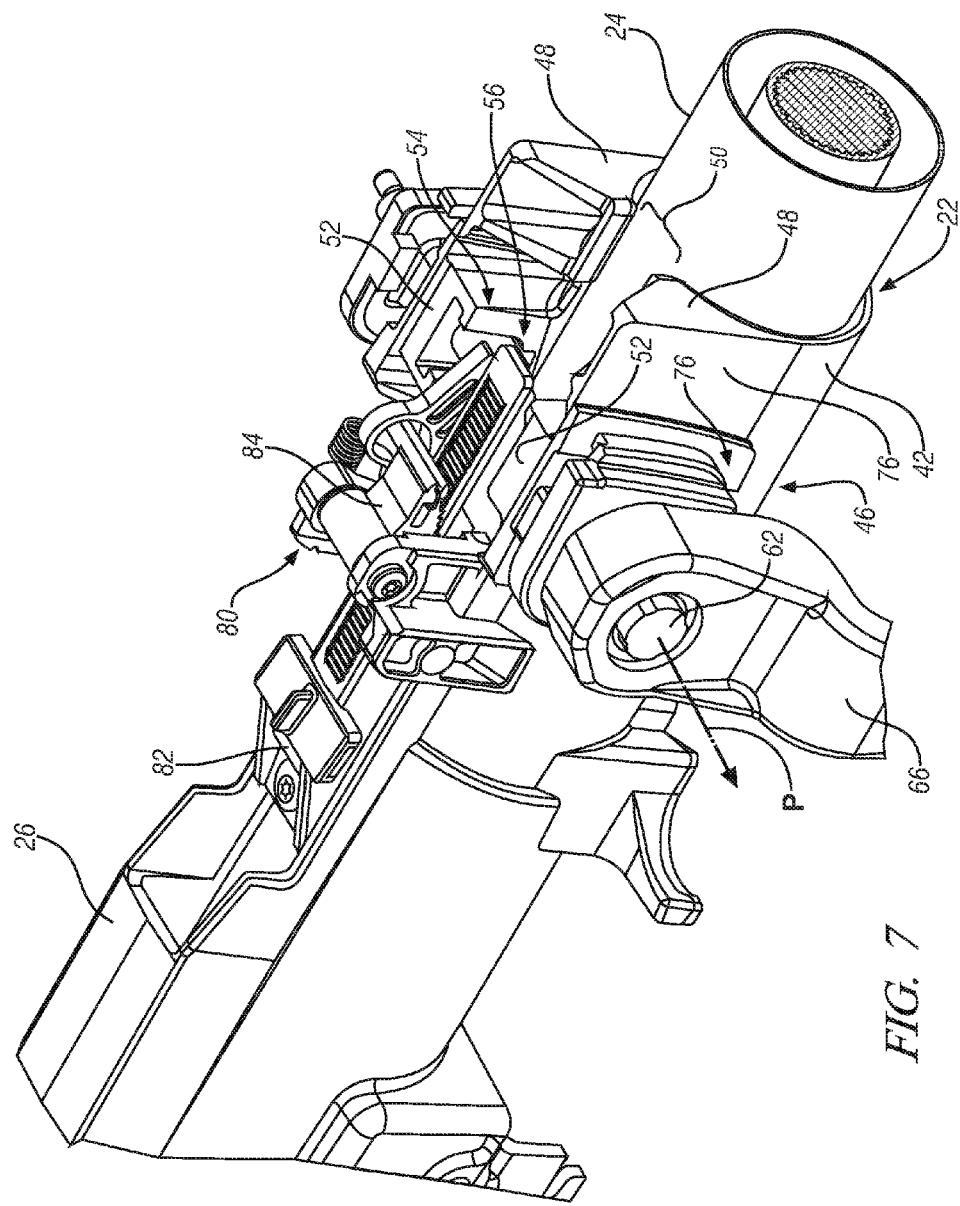
FIG. 7 is a perspective left side view of the assembly of FIG. 1 illustrating the inner jacket slidably disposed in the outer jacket with the bracket removed.

As shown in FIGS. 5 and 7, each of the side portions 46 include a semi-cylindrical flange 48 that extends generally toward the other and together they define a space 50 between them. This configuration permits the inner end 42 of the outer jacket 26 to flex or bend to selectively prevent movement of the inner jacket 24. The flanges 48 are configured to complement and generally conform to the inner jacket 24. In other words, the flanges 48 abut the inner jacket 24. It is to be appreciated that the flange 48 may be integrally formed with the side portions 46 or formed as separate components and affixed to them by any suitable permanent joint, such as various welds, or by the use of various joining devices, such as various types of fasteners, etc.

Referring to FIGS. 1, 4, 8 and 9, the outer end 44 of the outer jacket 26 is pivotally coupled to the back portion 32 of the bracket 28 such that the steering column 22 may pivot transverse to the longitudinal axis L relative to the bracket 28 and thereby allow raking movement in the raking direction 25. More specifically, a pair of opposing pins 58 (FIGS. 5 and 9) defining a tilt axis T transverse to the longitudinal axis L is pivotally coupled to the bracket 28 through concentric disposition within opposed bushings 59 that are in turn configured to be disposed within bracket 28 in concentric disposition about tilt axis T, such as by disposition of the bushings 59 and pins 58 in opposing pockets (not shown) in the back portion of 32 of column mounting bracket 28 that provide axial alignment of the bushings 59 and pins 58 with the tilt axis T and engage the bracket 28 and the lower end 44 of the outer jacket 26 such that steering column and the inner and outer jackets 24, 26 may pivot about the tilt axis T for adjusting the steering column 22 and steering wheel in the raking direction 25.

As shown in FIGS. 1, 4 and 5, the collapsible steering column assembly 20 further includes a selectively engageable locking device 60 coupled to the outer jacket 26 and the bracket 28 for selectively allowing the driver to adjust the steering wheel in the telescoping and raking directions 23, 25 by disengaging the locking device 60, moving the column and wheel in these directions to a predetermined position and then reengaging the device. More specifically, the locking device 60 is coupled to the upper end 42 of the outer jacket 26 and the arms 34 of the bracket 28 for selectively allowing adjustments of the inner and outer jackets 24, 26. The locking device 60 includes a bolt 62 disposed through the upper end 42 of the outer jacket 26 and the arms 34 of the bracket 28. The bolt 62 defines a pivot axis P transverse to and spaced from the longitudinal axis L with the pivot axis P also spaced from and substantially parallel to the tilt axis T. The bolt 62 is selectively rotatable about the pivot axis P as described herein.

The locking device 60 may include any suitable locking mechanism, such as, for example, a known cam-follower mechanism (not shown) or a tilt-pin mechanism 64 coupled to the bolt 62 for selectively applying an inwardly directed predetermined clamping pressure or force F to the arms 34, the outer jacket 26 and the inner jacket 24 along the pivot axis P for selectively locking the inner jacket 24 relative to the outer jacket 26 in the telescoping direction 23 and the angular position of the steering column 22 in the raking direction 25, thereby preventing further adjustment of the steering column 22 and wheel. It is to be appreciated that other suitable locking devices as known to those of ordinary skill in the art may be used for selectively preventing adjustments of the steering wheel instead of a cam-follower mechanism or the tilt-pin mechanism 64. Any suitable clamping force may be employed, including a clamping force of about 4000 N. It is to be appreciated that the clamping force may be higher or lower than 4000 N depending on the design requirements of the vehicle manufacturer.

The locking device 60 further includes a lever 66 mounted to the bolt 62 for allowing the driver to selectively engage and disengage the locking device 60 and adjust the position of the steering column 22 and steering wheel. The lever 66 is rotatable about the pivot axis P between a locked position for preventing adjustments of the steering wheel and an unlocked position for allowing adjustments of the steering wheel. When the lever 66 is in the locked position, the clamping force F is applied to the bracket 28 and/or the arms 34, the outer jacket 26 and the inner jacket 24 for preventing adjustments of the steering wheel. In other words, the bracket 28 and/or the arms 34 are clamped and squeezed together which clamps and squeezes against the outer jacket 26 which in turn clamps and squeezes against the inner jacket 24, thus preventing adjustments in the telescoping and raking directions. Having the space 50 between the first flanges 48 allows the upper end 42 of the outer jacket 26 to flex or bend such that the first flanges 48 move toward each other and second flanges 52 (FIG. 7) move toward each other for squeezing the inner jacket 24 to prevent adjustments in the telescoping and raking directions. When the lever 66 is in the unlocked position, the clamping force F is reduced or eliminated on the bracket 28 and/or the arms 34, the outer jacket 26 and the inner jacket 24 for allowing adjustments of the steering wheel in the telescoping and raking directions 23, 25.

Figure 10:
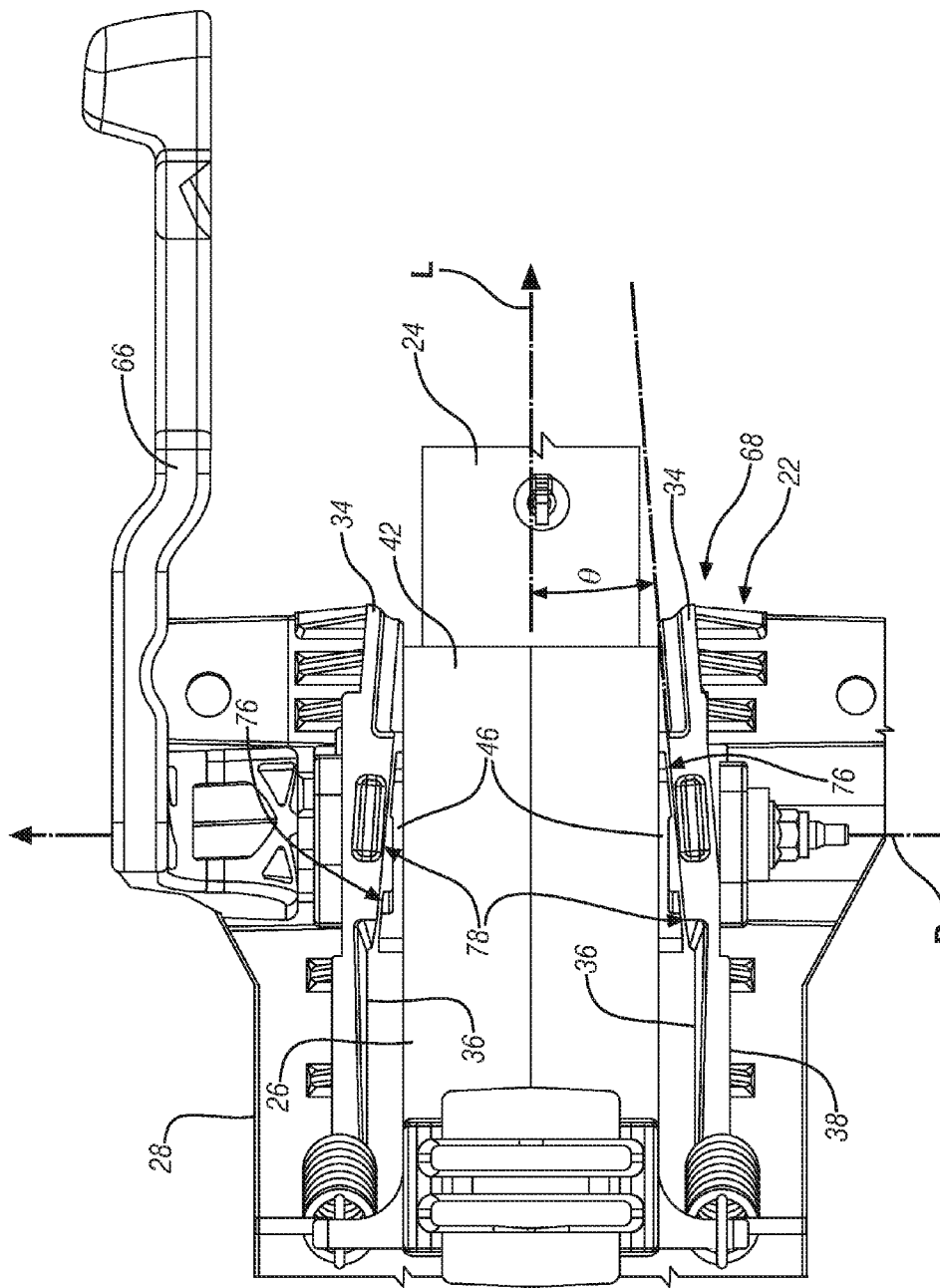
FIG. 10 is an enlarged bottom view of the outer jacket spaced from the arms in the post-collapse position taken from section 10 of FIG. 6.
Figure 11:
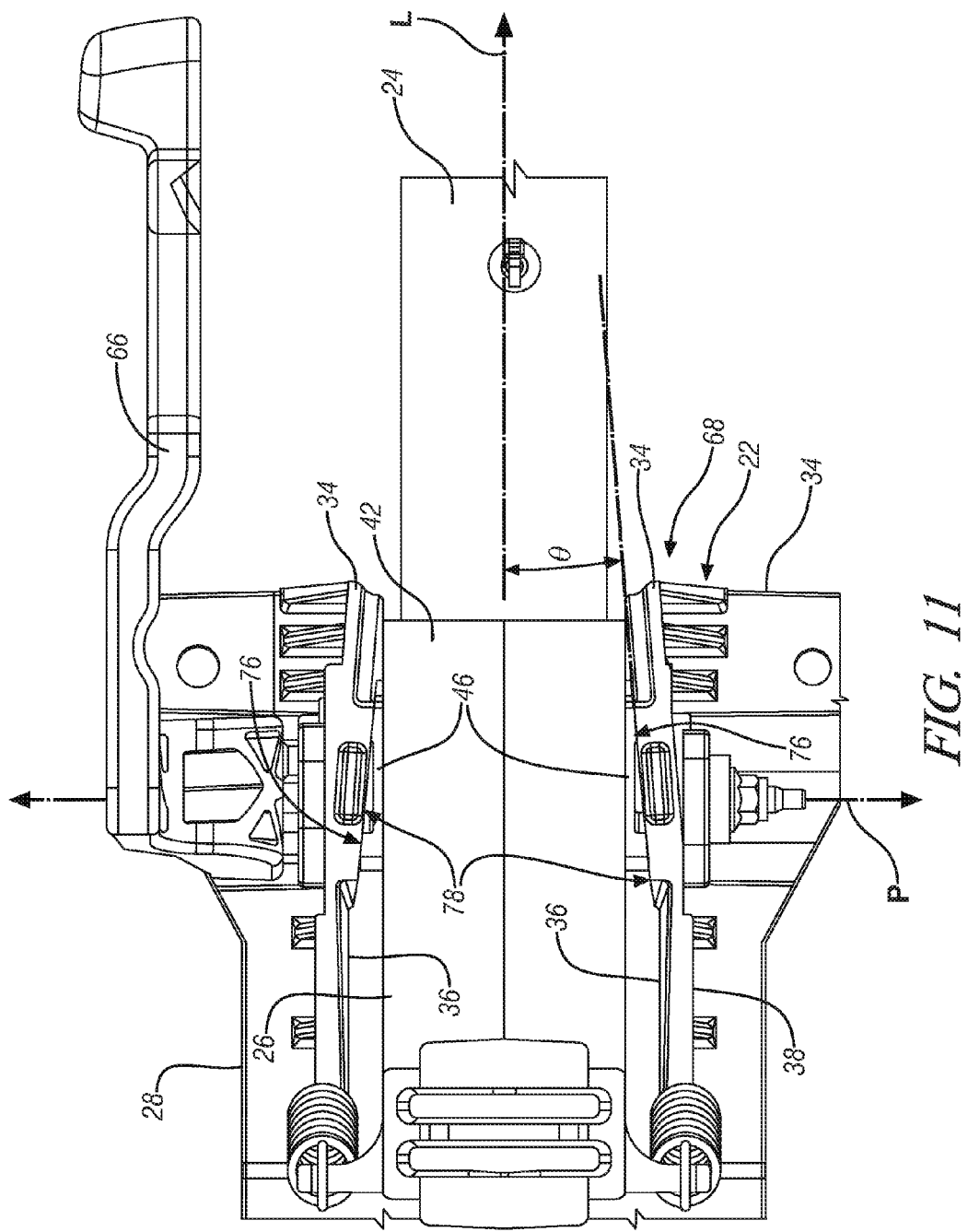
FIG. 11 is an enlarged bottom view of the outer jacket and the arms of FIG. 10 engaging each other in the pre-collapse position.

The collapsible steering column assembly 20 further includes a controlled release mechanism 68 for allowing the inner jacket 24 to collapse within the outer jacket 26 without having to overcome axial constraints of the locking device 60. This collapsible steering column assembly 20 eliminates the need for the bracket 28 to have release capsules and/or shear pins as known to those of ordinary skill in the art due to the configuration of the controlled release mechanism 68. As illustrated in FIGS. 6, 10 and 11, the controlled release mechanism 68 further includes a plurality of first angled surfaces 76 disposed on the upper end 42 of the outer jacket 26 and a plurality of second angled surfaces 78 disposed on the arms 34. More specifically, one of the first angled surfaces 76 is disposed on one of the side portions 46 of the upper end 42 of the outer jacket 26 and the other one of the first angled surfaces 76 is disposed on the other one of the side portions 46 of the upper end 42 of the outer jacket 26. In addition, one of the second angled surfaces 78 is disposed on the inner surface 36 of one of the arms 34 and the other one of the second angled surfaces 78 is disposed on the inner surface 36 of the other one of the arms 34. Each of the first and second angled surfaces 76, 78 are substantially flat planar configurations and each define an angled configuration relative to the longitudinal axis L with the angled configuration of the first angled surfaces 76 complementing the angled configuration of the adjacent second angled surfaces 78, which is discussed further below. Typically, the angled configuration is a relatively shallow angle θ, as shown in FIGS. 10 and 11, such as, for example, about 5 degrees. It is to be appreciated that the angled configuration may be more or less than about 5 degrees.

Referring to FIG. 11, when the steering column 22 is in the pre-collapse position, the first angled surfaces 76 abut the respective second angled surfaces 78 and provide frictional engagement therebetween. When the steering column 22 is in the post-collapse position, as shown in FIGS. 6 and 10, the first angled surfaces 76 are axially spaced or separated from the respective second angled surfaces 78, thereby eliminating the frictional engagement between the bracket 28 and the outer jacket 26 which also reduces or eliminates the clamping force F on the outer jacket 26 thus allowing the inner jacket 24 to collapse within the outer jacket 26. Therefore, this collapsible steering column assembly 20 provides an effective way to relieve the clamping force F applied to the inner and outer jackets 24, 26 to allow the inner jacket 24 to collapse within the outer jacket 26 without having to overcome axial constraints of the locking device 60, which will be further discussed in the operation of the assembly 20 below.

Figure 14:
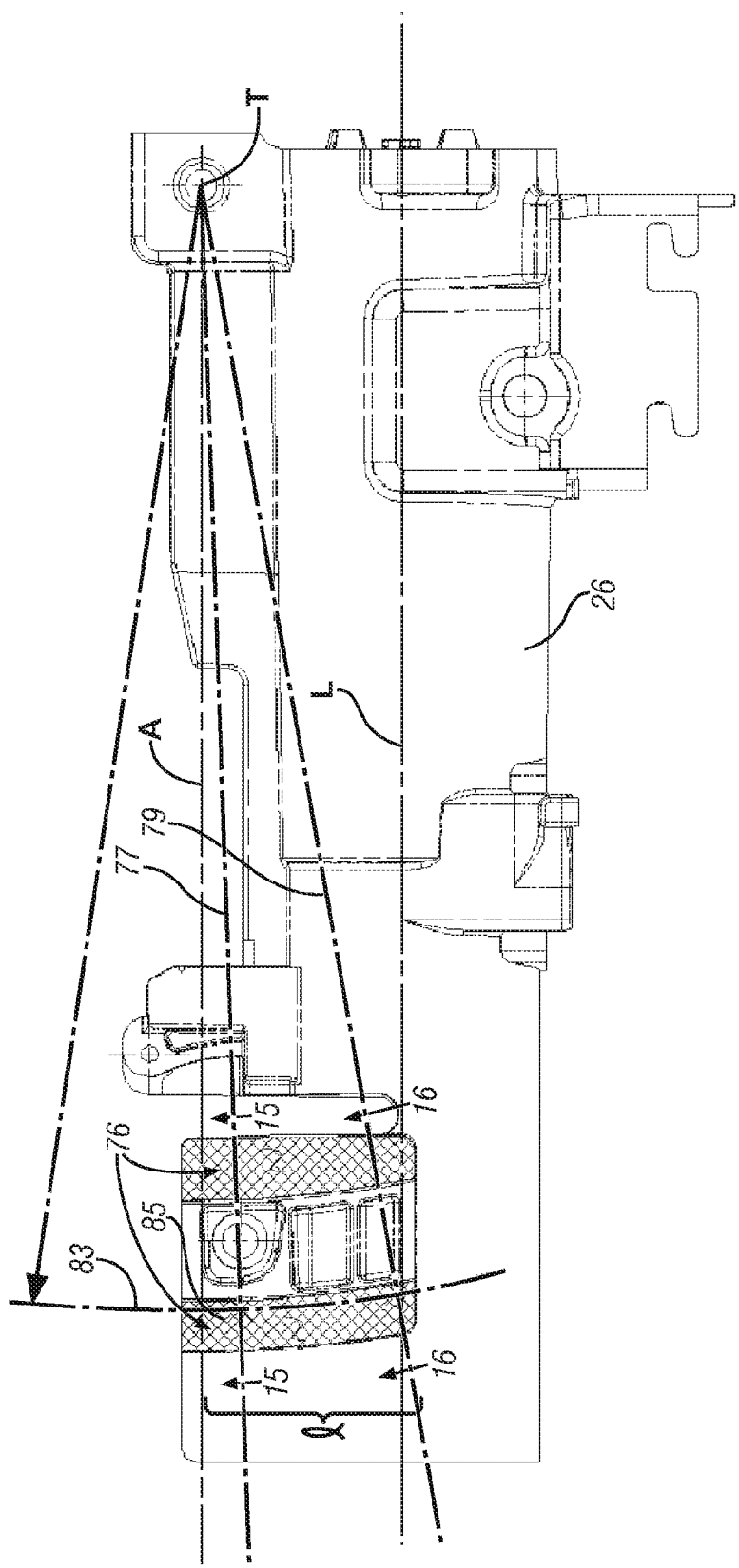
FIG. 14 is a side view of the outer jacket and first angled surfaces of FIG. 4.
Figure 15:
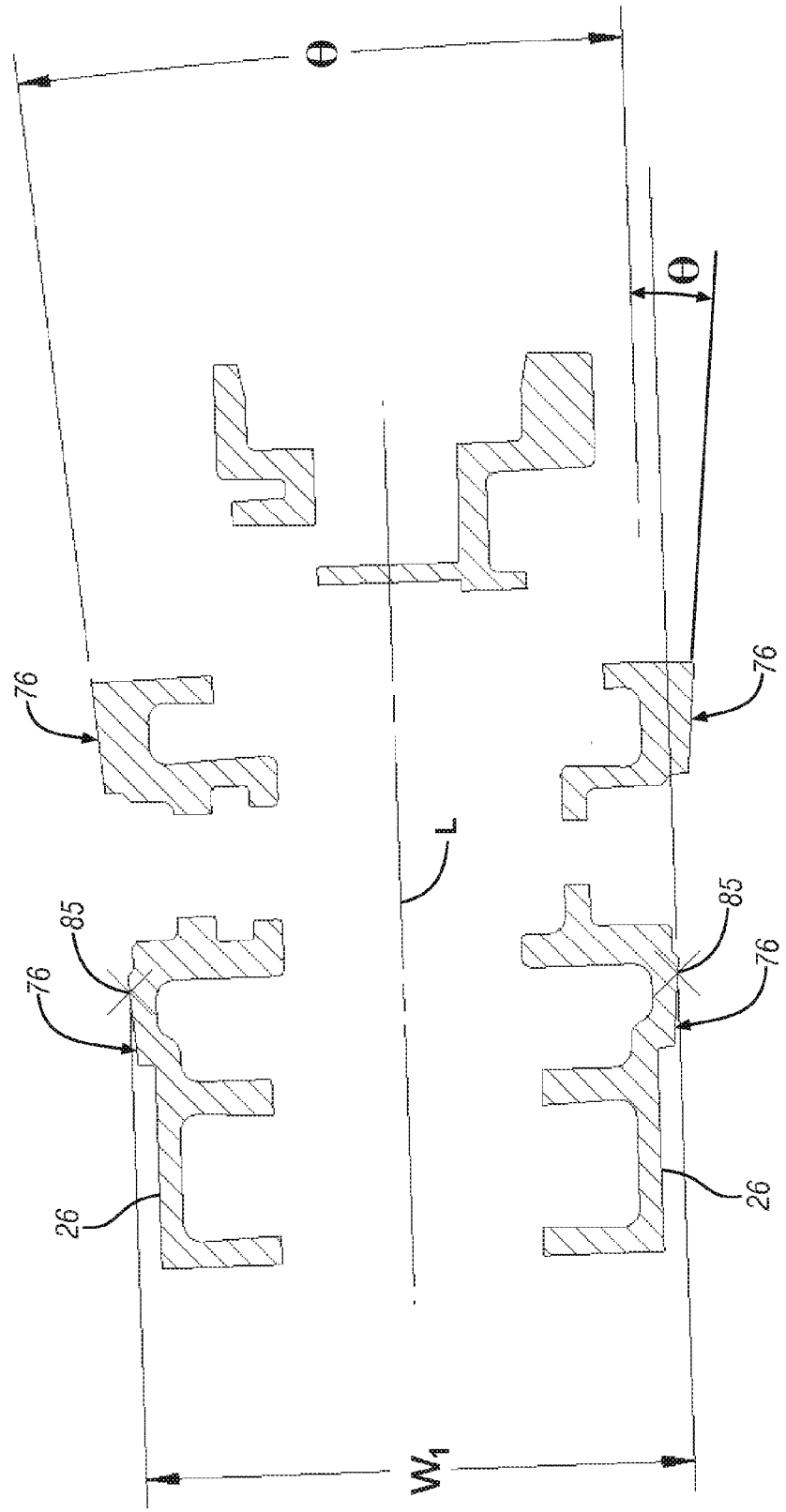
FIG. 15 is a cross-sectional view of the outer jacket of FIG. 14 taken along Section 15-15.
Figure 16:
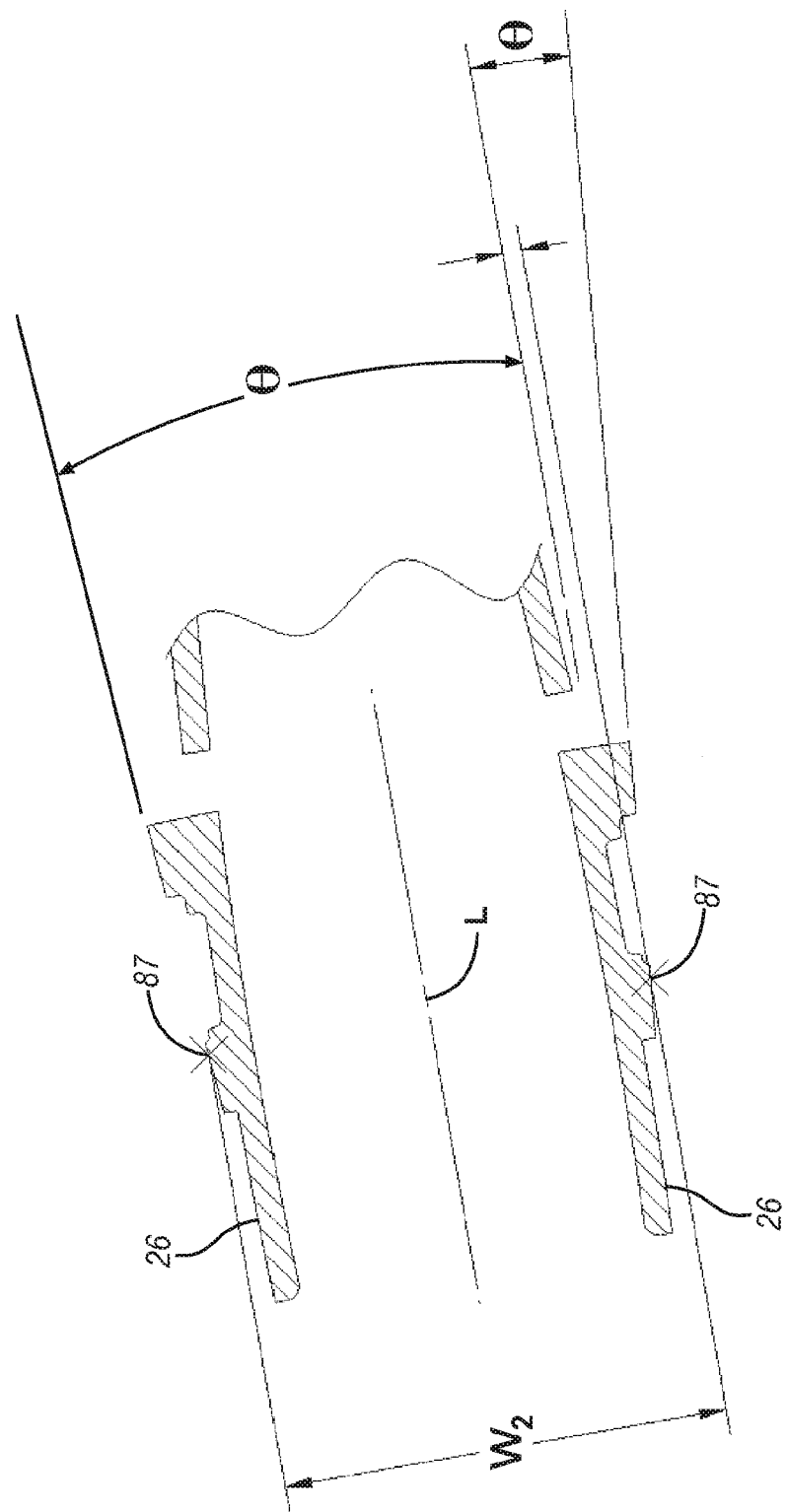
FIG. 16 is a cross-sectional view of the outer jacket of FIG. 14 taken along Section 16-16.

Referring to FIGS. 14-16, the first angled surfaces 76 and second angled surfaces 78 are configured to slide over one another when the during adjustment of the rake position of the column. In order to facilitate smooth movement of the surfaces over one another and prevent binding or pressure, as well as to ensure mating engagement for secure lockup of the steering column 22, the first angled surfaces 76 and second angled surfaces 78 have a complementary complex taper. As the rake position is adjusted, the steering column pivots about the tilt axis T. In order to facilitate this movement, the first surfaces 76 may have a complex taper angle θ that is constant as measured along a bisector 81 of an arc of curvature 83 about the tilt axis that sweeps across the length 1 of these surfaces from an upper portion to a lower portion thereof, as shown in FIG. 14. For example, the complex taper angle θ across the surfaces 76 along a first bisector 77 at, for example, about 2 degrees down angle from an axis A that is parallel to longitudinal axis L and passing through the center of and orthogonal to tilt axis T is the same as the taper angle across the surfaces 76 along a second bisector 79 at, for example, 10 degrees down angle from a horizontal axis parallel to longitudinal axis L and passing through the center of and orthogonal to tilt axis T, or any other similarly constructed bisectors. Further, the first angled surfaces 76 may also have a width w between the surfaces 76 on either side of the outer jacket 26 along any point of intersection of the various bisectors along an arc of curvature across the length 1 that is the same as shown in FIGS. 15 and 16, such as at points 85 and 87 along arc of curvature 83, where $w_1$ and $w_2$ are equal. The complex taper angles of the second angled surfaces 78 may be selected to complement the complex taper angles of the first angled surfaces 76 in every respect, including along their length and across their width. The first and second complex taper angles 76, 78 may be any suitable angles, including angles of about 5 degrees.

Figure 8:
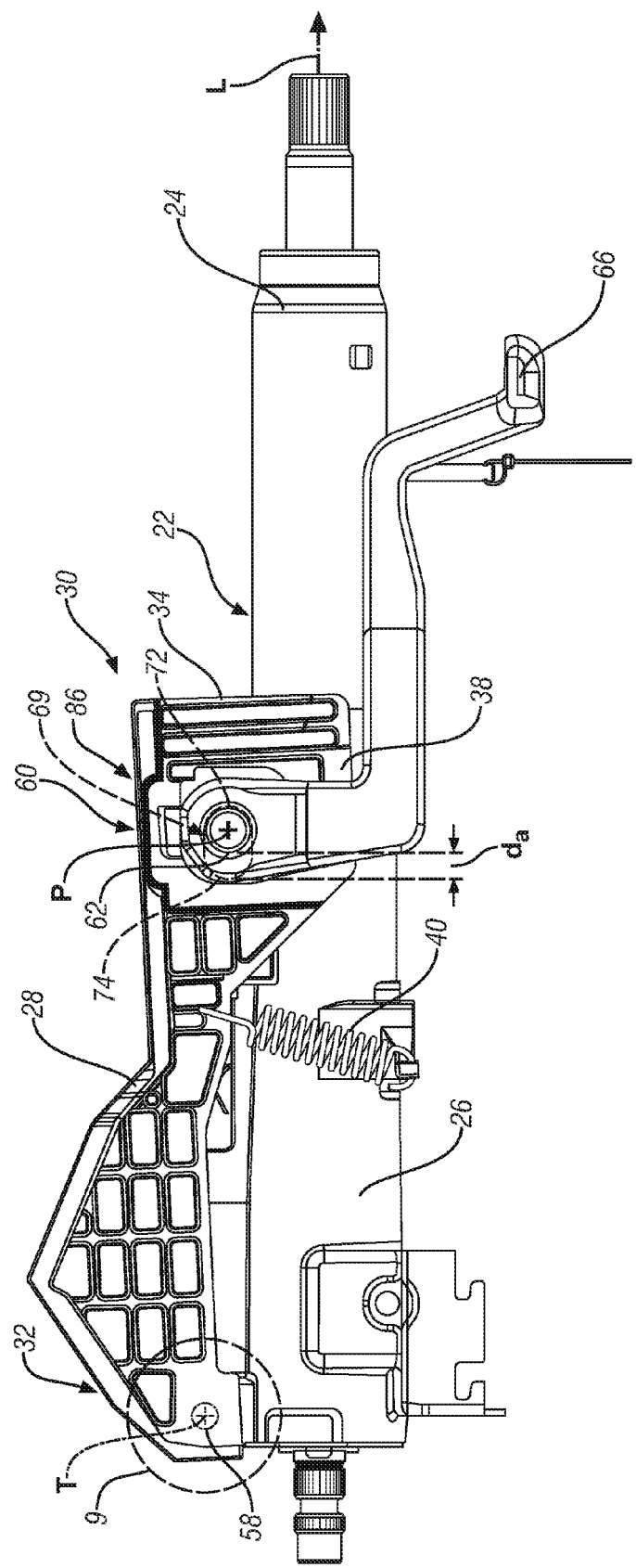
FIG. 8 is a left side view of the collapsible steering column assembly and is also used to illustrate an alternate embodiment of a capture mechanism and controlled release mechanism.
Figure 9:
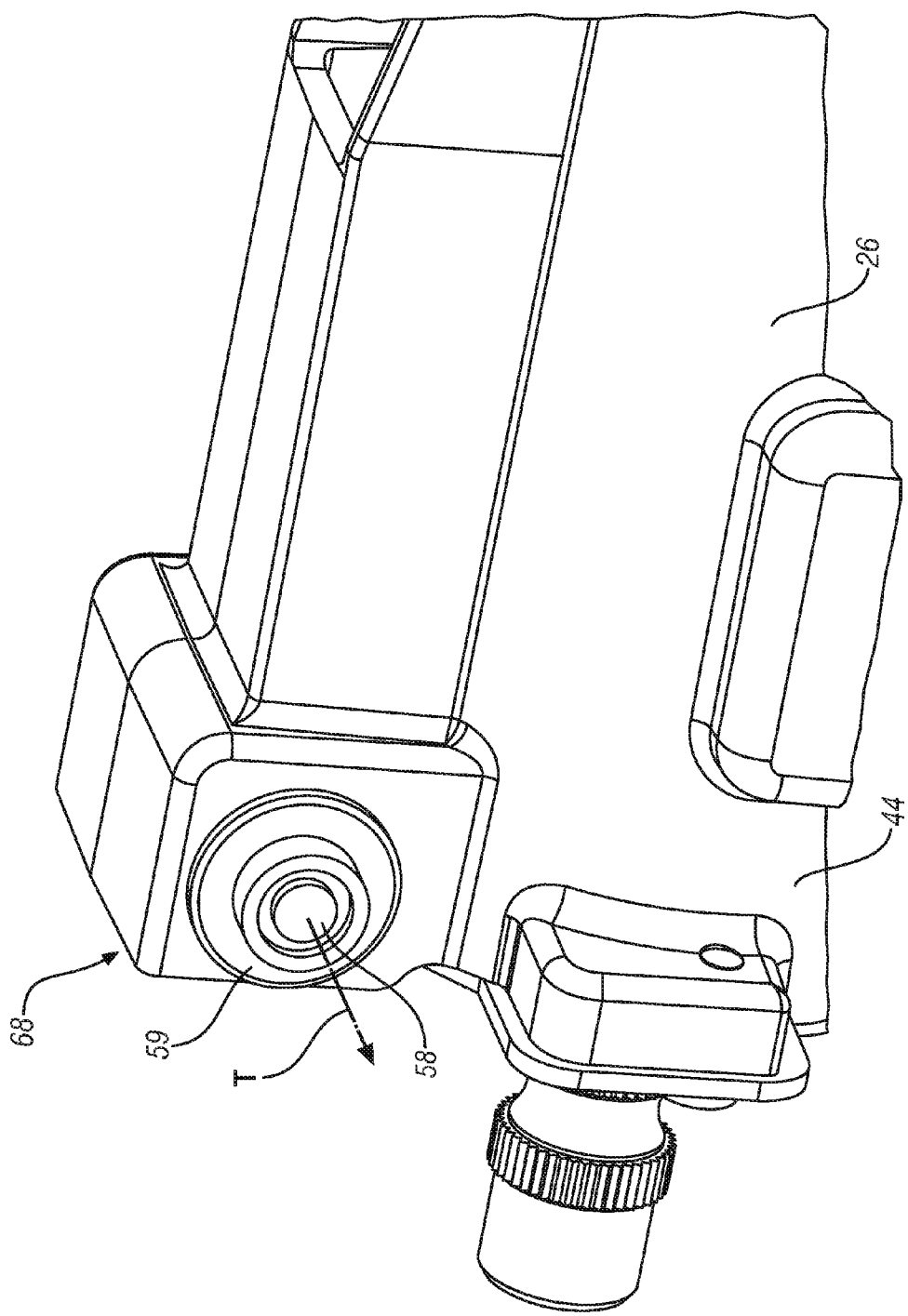
FIG. 9 is an enlarged view of a pin disposed through the outer jacket taken from section 9 of FIG. 8 with the pin disposed in the pre-collapse position.

The release is controlled with respect to the predetermined axial release force that must be applied to the exposed end 27 of inner jacket 24 in order to cause the axial separation as described herein. The release is also controlled in that the maximum amount of the axial separation of first angled surfaces 76 and second angled surfaces 78 is controlled by using a capture mechanism 69 to capture the outer jacket 26 once it has been released by application of the predetermined axial release force. In one exemplary embodiment, the capture mechanism 69 (FIGS. 12 and 13) of controlled release mechanism 68 also comprises the positive rake lock mechanism 86, which is selected not only to provide the positive rake lock, it also may be designed to provide limited axial movement of outer jacket 26, as described herein. Optionally, referring to FIG. 8, in another exemplary embodiment the release mechanism 68 defines a capture mechanism 69 that includes a plurality of slots 70 in each of the upper and lower ends 42, 44 of the outer jacket 26. Each of the slots 70 extends generally parallel to the longitudinal axis L and extends a predetermined length and is spaced from the other slots relative to the longitudinal axis L. The bolt 62 is disposed through the slots 70 of the upper end 42 and the pin 58 is disposed through the slots 70 of the lower end 44. The slots 70 include an lower end portion 74 and an upper end portion 72 spaced from each other. The pin 58 and the bolt 62 are disposed in the lower end portions 74 of the respective slots 70 when in the pre-collapse position as shown in FIG. 8. The pin 58 and the bolt 62 are disposed in the upper end portions 72 of the respective slots 70 when in the post-collapse position. By selection of the size of the pin 58 and bolt 62, as well as the predetermined length of the slot, the maximum axial distance $d_a$ that the pin and bolt may move is predetermined.

Optionally, as illustrated in FIGS. 2, 5 and 7, the collapsible steering column assembly 20 may include an energy absorbing device 80. The energy absorbing device 80 may be any suitable energy absorbing device known to those of ordinary skill in the art. For example, the energy absorbing device 80 may include a strap 82 and a locking cam 84 coupled to the bolt 62 and the lever 66 for selectively engaging the strap 82. The strap 82 is affixed to the inner jacket 24 such that when the inner jacket 24 collapses within the outer jacket 26, the strap 82 is pulled with the inner jacket 24 and thereby deformed for absorbing energy.

Figure 12:
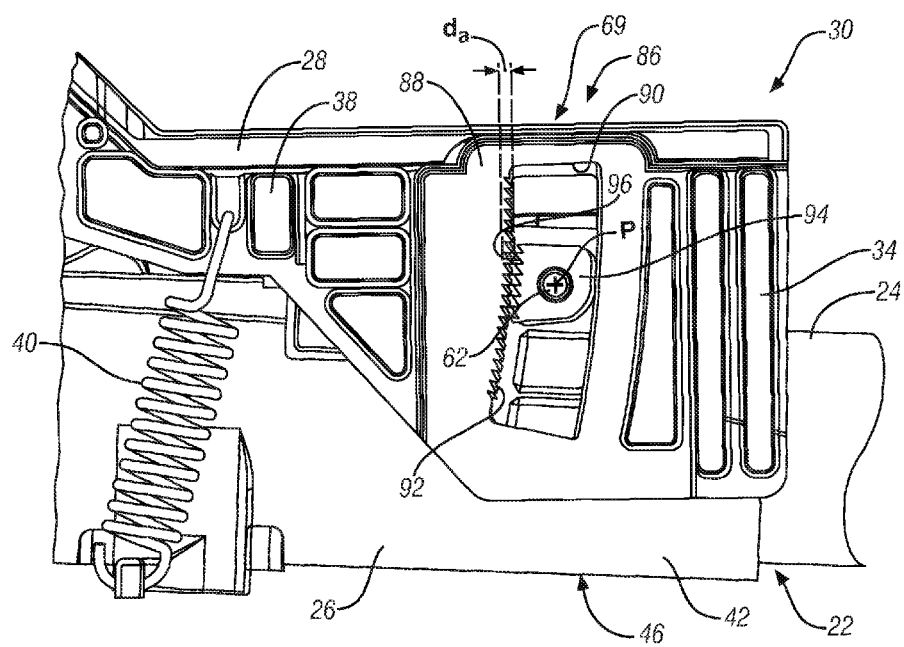
FIG. 12 is a side view of an exemplary embodiment of a positive lock mechanism in the pre-collapse position.
Figure 13:
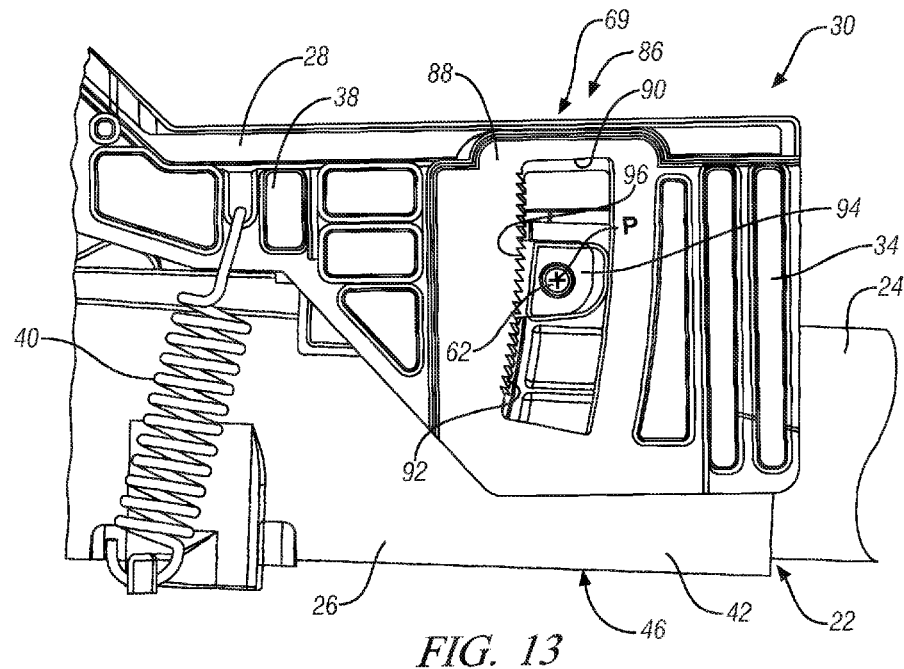
FIG. 13 is a side view of the positive lock mechanism of FIG. 12 in the post-collapse position.

In addition, as shown in FIGS. 1, 12 and 13, the collapsible steering column assembly 20 may optionally include a positive rake lock mechanism 86. The positive lock mechanism 86 may be any suitable positive lock mechanism known to those of ordinary skill in the art. For example, the positive lock mechanism 86 may include an integral support 88 incorporated into at least one of the arms 34, or may alternately include a separate support abutting the outer surface of at least one of the arms (not shown). The support 88 defines an opening 90 with the bolt 62 disposed through the opening 90. The opening 90 includes a plurality of teeth 92 on one side of the opening 90. The positive lock mechanism 86 further includes a pawl 94 having a plurality of teeth 96 with the bolt 62 disposed through the pawl 94. The pawl 94 is affixed to one of the side portions 46 of the outer jacket 26 such that the pawl 94 moves with the outer jacket 26. The teeth 96 of the pawl 94 face the teeth 92 of the opening 90 and are spaced from the teeth 92 of the opening 90 during disengagement and unlocking of locking device 60 and adjustments of the steering column 22 and wheel in the raking direction 25, as shown in FIG. 12. When the inner and outer jackets 24, 26 move to the post-collapse position, the pawl 94 moves with the bolt 62 along the longitudinal axis L and the teeth 96 of the pawl 94 engage the teeth 92 of the opening 90 for preventing undesirable angular movement of the steering column 22 in the raking direction, as shown in FIG. 13. The positive rake lock mechanism 86 also may include the controlled release mechanism 68, particularly the capture mechanism 69. The spacing and dimensions of the elements of the mechanism, including the support 88, pawl 94 and their respective teeth 92, 96 may be used to control the maximum axial distance d (FIG. 12) that outer jacket 26 may travel upon its release from bracket 28.

For illustrative purposes only, an example of the steering column 22 moving from the pre-collapse position to the post-collapse position will be discussed below to illustrate the workings of the assembly, particularly the inner jacket 24 collapsing within the outer jacket 26 without having to overcome axial constraints of the locking device 60.

Referring to FIGS. 2 and 11, the steering column 22 is shown in the pre-collapse position. When in the pre-collapse position, the upper end 42 of the outer jacket 26 engages the inner surfaces 36 of the arms 34 of the bracket 28. More specifically, the second angled surfaces 78 of the arms 34 abut the respective first angled surfaces 76 of the side portions 46 of the outer jacket 26 for providing a frictional engagement (locking) therebetween and the controlled release mechanism 68. In the embodiment of FIGS. 12 and 13, the teeth 96 of the pawl 94 of the positive lock mechanism 86 are spaced from the teeth 92 of the opening 90 of the support 88 and provide the capture mechanism.

Referring to FIGS. 3 and 10, the steering column 22 is shown in the post-collapse position. When the predetermined force is applied to the exposed end 27 of the inner jacket 24, the frictional forces between the outer jacket 26 and the arms 34 of the bracket 28, or outer jacket release forces, are overcome without overcoming the frictional inner jacket release forces between the inner and outer jackets 24, 26. The outer jacket 26 may release from the bracket 28 when a force of about 2000 N is achieved. It is to be appreciated that the outer jacket 26 may also release from the bracket 28 when a force higher or lower than about 2000 N is achieved.

The frictional forces between the inner and outer jackets 24, 26 and/or the strap 82 and/or the clamping force allow the inner and outer jackets 24, 26 to move together along the longitudinal axis L for a predetermined distance. In other words, the inner and outer jackets 24, 26 move as one unit such that the inner jacket 24 does not collapse within the outer jacket 26 during the predetermined distance of movement of the inner and outer jackets 24, 26 along the longitudinal axis L. For example, the predetermined distance that the inner and outer jackets 24, 26 travel together may be about 2 millimeters. It is to be appreciated that the predetermined distance may be more or less than about 2 millimeters depending on the vehicle requirements of the manufacturer.

The outer jacket 26 is able to move along the longitudinal axis L the predetermined distance $d_a$ due to the arrangement of the elements of the positive lock mechanism 86 that also provide capture mechanism 69. The pawl 94 travels the predetermined distance with the outer jacket 26 and the teeth 96 of the pawl 94 engage the teeth 92 of the opening 90 for preventing undesirable movement of the steering column 22 in the raking direction, as shown in FIG. 13.

As the inner and outer jackets 24, 26 move the predetermined axial distance d, the first and second angled surfaces 76, 78 become spaced from each other (as shown in FIG. 10) and the clamping force F is reduced or eliminated on the outer jacket 26 which allows the inner jacket 24 to collapse within the outer jacket 26. In other words, the inner and outer jackets 24, 26 are moving relative to the bracket 28 and the locking device 60 and once the outer jacket 26 moves the predetermined axial distance d and the first and second angled surfaces 76, 78 are spaced from each other, the inner jacket 24 will collapse within the outer jacket 26 because the clamping force F applied to the inner and outer jackets 24, 26 is overcome. The inner and outer jackets 24, 26 do not have to overcome the axial constraint of the locking device 60 due to the second angled surfaces 78 of the outer jacket 26 becoming spaced apart from the first angled surfaces 76 of the bracket 28 while moving radially away from the pivot axis P where the axial constraint is applied.

The inner jacket 24 collapses within the outer jacket 26 when a predetermined inner jacket release force is achieved. For example, the predetermined inner jacket release force may be from about 1090 N to about 1500 N. It will be appreciated that the predetermined release force may be lower than 1000 N and higher than 1500 N depending on the vehicle requirements of the manufacturer.

Also, as shown in FIG. 3, as the inner jacket 24 collapses within the outer jacket 26, the energy absorbing device 80 is elongated and thereby absorbs energy. More specifically, the strap 82 is pulled with the inner jacket 24 and deformed (elongated) as the inner jacket 24 travels through the outer jacket 26 for absorbing energy.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A collapsible steering column assembly, comprising:
a unitary column mounting bracket configured for mounting to a vehicle, the bracket having a front portion and a back portion, the front portion comprising a pair of spaced arms, each arm having an inner surface that opposes the inner surface of the other and an opposed outer surface;
a steering column having a longitudinal axis and comprising an inner jacket that is slidably disposed within an inner surface of an outer jacket to longitudinally adjust a telescope position of the steering column, the outer jacket having an outer end and an inner end, the inner jacket slidably disposed in the inner end of the outer jacket, the outer end of the outer jacket pivotally attached about a tilt axis to the back portion of the column mounting bracket to pivotally adjust the steering column within the column mounting bracket to a rake position, an outer surface of the inner end of the outer jacket located adjacent to and pivotally, slidably disposed within the inner surfaces of the spaced arms;
a locking device that passes through and is coupled to the spaced arms and the outer jacket, the locking device movable to lock or unlock the slidable disposition of the inner jacket within the outer jacket and the pivotal, slidable disposition of the outer surface and inner surfaces, by respective application or release of a predetermined clamping force to the outer surfaces of the arms, to respectively clamp or release the inner surfaces of the arms directly against the outer surface of the outer jacket, and inner surface of the outer jacket against an outer surface of the inner jacket, to fix the telescope position and the rake position of the steering column, the locking device and the outer surface of the outer jacket axially movable a predetermined axial distance from the inner surfaces of the arms while locked upon application of a predetermined release force to an exposed end of the inner jacket to provide separation of the outer surface of the outer bracket from the inner surfaces of the arms and release the application of the predetermined clamping force between the outer jacket and inner jacket, thereby allowing the inner jacket to collapse into the outer jacket upon application of the predetermined release force.

2. The steering column assembly of claim 1, wherein the outer surface of the outer jacket comprises a plurality of first angled surfaces proximate an inner end of the outer jacket that taper inwardly toward the inner end and the inner surfaces of the arms comprise a plurality of second angled surfaces that taper inwardly toward the front portion of the bracket.

3. The steering column assembly of claim 2, wherein the first angled surfaces have a taper angle θ measured with reference to the longitudinal axis, and wherein the first angled surfaces and the second angled surfaces are configured for mating engagement with one another upon application of the predetermined clamping force.

4. The steering column assembly of claim 3, wherein the first angled surfaces comprise a constant taper angle θ measured along an arc of curvature about the tilt axis on one of the surfaces along a length of the arc.

5. The steering column assembly of claim 4, wherein the first angled surfaces are disposed on opposite sides of the outer jacket and a distance between the first angled surfaces on opposite sides of the outer jacket is constant at any point along the length of the arc of curvature.

6. The steering column assembly of claim 2, wherein when the locking device is locked, the plurality of first angled surfaces abut the plurality of second angled surfaces.

7. The steering column assembly of claim 2, wherein the first angled surfaces have an angle θ relative to the longitudinal axis of about 5 degrees.

8. The steering column assembly of claim 1, wherein the locking device comprises a rotatable bolt and a locking mechanism coupled thereto.

9. The steering column assembly of claim 8, wherein the locking mechanism comprises a cam-follower mechanism or a tilt-pin mechanism.

10. The steering column assembly of claim 8, wherein the locking device has an associated controlled release mechanism.

11. The steering column assembly of claim 10, wherein the controlled release mechanism comprises a plurality of slots in the outer jacket in which the rotatable bolt is disposed.

12. The steering column assembly of claim 11, wherein the plurality of slots extends generally parallel to the longitudinal axis and enables movement of the rotatable bolt by a predetermined axial distance.

13. The steering column assembly of claim 12, wherein the predetermined distance is about 2 mm.

14. The steering column assembly of claim 13, wherein the assembly further comprises a positive rake lock mechanism.

15. The steering column assembly of claim 14, wherein release of the controlled release mechanism engages the positive rake lock mechanism.

16. The steering column assembly of claim 15, wherein release of the controlled release mechanism and engagement of the positive rake lock mechanism enables controlled movement of the outer jacket by a predetermined axial distance.

17. The steering column assembly of claim 16, wherein the predetermined axial distance is about 2 mm.

18. The steering column assembly of claim 1, wherein the assembly is attached to the vehicle.

\* \* \* \* \*